US009621262B1

(12) United States Patent
Timmins et al.

(10) Patent No.: US 9,621,262 B1
(45) Date of Patent: Apr. 11, 2017

(54) SELF-MONITORING CABLE SYSTEM (71) Applicant: Optical Cable Corporation, Roanoke, VA (US)

(72) Inventors: Ian J. Timmins, Asheville, NC (US); G. Thomas Hazelton, Jr., Plano, TX (US)

(73) Assignee: Optical Cable Corporation, Roanoke, VA (US)

( * ) Notice: Subject to any disclaimer, the term of this patent is extended or adjusted under 35 U.S.C. 154(b) by 13 days.

(21) Appl. No.: 14/340,204

(22) Filed: Jul. 24, 2014

Related U.S. Application Data (60) Provisional application No. 61/858,084, filed on Jul. 24, 2013.

(51) Int. Cl.
*H04B 10/071* (2013.01)
*H04B 10/079* (2013.01)

(52) U.S. Cl.
CPC ....... *H04B 10/0791* (2013.01); *H04B 10/071* (2013.01)

(58) Field of Classification Search
CPC H04B 10/071; H04B 10/272; H04B 10/0771; H04B 10/0773; H04B 10/40; H04B 10/506
USPC ...................................... 398/16, 25
See application file for complete search history.

(56) References Cited

U.S. PATENT DOCUMENTS 5,509,122 A * 4/1996 Bartow ................. G06F 13/122
709/227
6,233,437 B1 * 5/2001 Klenner ................ H04W 24/00
375/132
7,280,189 B2 10/2007 Weller
7,388,657 B2 * 6/2008 Abbott ................. H04B 10/071
356/73.1
7,630,641 B1 * 12/2009 Uhlhorn ............... H04B 10/071
398/28
8,411,259 B2 4/2013 Levin et al.
2004/0017967 A1 * 1/2004 Tajima ................. G02B 6/3562
385/24

(Continued)

FOREIGN PATENT DOCUMENTS

CN     201742408 U     2/2011
CN     202818298 U     3/2013

(Continued)

*Primary Examiner* — David Payne
*Assistant Examiner* — Tanya Motsinger
(74) *Attorney, Agent, or Firm* — The Van Winkle Law Firm; David M. Carter; William G. Heedy (57) ABSTRACT

A cabling system that provides continuous transport of data, as well as testing. At all times a channel is available for data transmission. In one embodiment, the cabling system includes a cable in turn including two data transmission channels. First and second transceivers are provided at respective opposite ends of the cable connected to the data transmission channels. At least one of the transceivers is functionally capable of both a data transmission mode and a test or audit mode, and periodically alternates between two operational modes. In another embodiment, first and second transceivers are provided at respective opposite ends of the cable and connected to a data transmission channel. At least one of the transceivers is functionally capable of both data transmission employing one wavelength and testing or auditing employing another wavelength.

15 Claims, 6 Drawing Sheets

(56) References Cited

U.S. PATENT DOCUMENTS

| | | | | |
|---|---|---|---|---|
| 2004/0088405 A1* | 5/2004 | Aggarwal | H04L 41/069 | 709/224 |
| 2005/0141892 A1* | 6/2005 | Park | H04B 10/032 | 398/71 |
| 2006/0165417 A1* | 7/2006 | Hsieh | H04B 10/40 | 398/138 |
| 2007/0036545 A1* | 2/2007 | Lautenschlager | H04B 10/071 | 398/33 |
| 2008/0089692 A1* | 4/2008 | Sorin | H04J 14/02 | 398/135 |
| 2008/0199185 A1* | 8/2008 | Miller | H04B 10/071 | 398/139 |
| 2011/0255860 A1* | 10/2011 | Lee | G01M 11/3136 | 398/12 |
| 2012/0020672 A1* | 1/2012 | Aguren | G01M 11/3154 | 398/139 |
| 2012/0163800 A1* | 6/2012 | Urban | H04B 10/071 | 398/12 |
| 2012/0243863 A1* | 9/2012 | Zhao | H04B 10/071 | 398/16 |
| 2013/0188951 A1* | 7/2013 | Zheng | G02B 6/12019 | 398/58 |
| 2013/0223838 A1* | 8/2013 | Horishita | H04B 10/071 | 398/13 |
| 2013/0259466 A1* | 10/2013 | Chen | G01M 11/3127 | 398/5 |
| 2013/0294768 A1* | 11/2013 | Lee | H04B 10/071 | 398/33 |
| 2014/0097756 A1* | 4/2014 | Zhong | H04B 10/071 | 315/151 |
| 2014/0126900 A1* | 5/2014 | Urban | G01M 11/3145 | 398/13 |

FOREIGN PATENT DOCUMENTS

| | | |
|---|---|---|
| WO | 2011053306 A1 | 5/2011 |
| WO | 2013097785 A1 | 7/2013 |

* cited by examiner

SELF-MONITORING CABLE SYSTEM

CROSS-REFERENCE TO RELATED APPLICATION

The benefit of U.S. provisional patent application Ser. No. 61/858,084, filed Jul. 24, 2013, is claimed, and the entire disclosure of application Ser. No. 61/858,084 is hereby expressly incorporated by reference.

BACKGROUND OF THE INVENTION

The invention relates to the field of testing data communications networks, particularly data communications networks employing optical fibers.

Conventional data communications services, whether implemented in copper transmission wiring or in fiber optic cables, often incorporate testing equipment to determine the current state of a network. The advent of time domain reflectometers has allowed test signals to be sent out over conductors, and if a discontinuity or fault exists at a point along the circuit, a portion of the test signal is reflected back to the source. The time it takes for the reflected signal to return to the source is an indication of the distance along the conductor at which the discontinuity or fault lies. Time Domain Reflectometry (TDR) technology is extremely useful in long runs of cable because it allows the identification of a problem at a particular point along the conduit. With the increasing use of fiber optic technology in data transmission, Optical Time Domain Reflectometers (OTDR) utilize the analogous concepts in testing optical signal transmission.

Prior transmission testing systems and techniques incorporate test signals into live data networks, but each technique has its limitations. For example, the test signal may be sent along non-service frequencies of a usable spectrum. As another example, in the context of optical fibers, portions of a network may incorporate a shutter to allow for testing during particular time intervals. Other systems bring down a certain portion of a network to test a portion of the conductors, such as testing dark fiber for integrity before use. Some of these prior systems utilize time domain reflectometers that are external to the data circuit within the network.

SUMMARY OF THE INVENTION

In one aspect, a cabling system that provides continuous transport of data, as well as testing, is provided. The cabling system includes a cable in turn including two data transmission channels. A transceiver is provided at an end of the cable connected to the data transmission channels. The transceiver is functionally capable of both a data transmission mode and a test or audit mode. The transceiver is operable to periodically alternate between a first operational mode characterized by data transmission on one of the data transmission channels and testing or auditing the other of the data transmission channels, and a second operational mode characterized by data transmission on the other of the data transmission channels and testing or auditing the one of the data transmission channels. As a result, at all times at least one of the data transmission channels is available for data transmission.

In another aspect, a cabling system that provides continuous transport of data, as well as testing, is provided. The cabling system includes a cable in turn including a data transmission channel. A transceiver is provided at an end of the cable connected to the data transmission channel. The transceiver is functionally capable of both data transmission employing one wavelength and testing or auditing employing another wavelength. As a result, at all times at least one of the data transmission channels is available for data transmission.

In yet another aspect, a failure-prediction system is provided in a cabling system that provides continuous transport of data as well as testing. The failure-prediction system includes a testing or auditing subsystem for at least periodically testing a data transmission channel. An historical data subsystem collects and stores functional test results. An analysis subsystem tracks stored functional test results over time to determine system degradation prior to actual failure of the data transmission channel.

DETAILED DESCRIPTION

In overview, embodiments of the invention, in the field of data networks and telecommunications, incorporate test capabilities into a system in a manner that allows continuous transport of data as well as testing along a live portion of a communications network.

Self-monitoring data communications network systems disclosed herein incorporate three particular aspects in network monitoring. First, the system includes a transceiver with integrated testing ability so that the system can check the integrity of the communications channel and report any current degradation in transmission quality. Second, the system accommodates the integrated testing transceivers by positioning the transceivers directly within diverse structures connected to the network, including but not limited to, rack mount patch panels, connector housings joining cables in the network, remote enclosures or remote devices on the network, or even deployable reels used in the field. Finally, by incorporating the integrated testing transceiver with added functionality at strategic locations throughout the system, the self-monitoring data communications network can manage not only content data along a data path, but the transceivers in the network have added functionality of providing a testing data path via an overlay transmission, such as wireless data transmitted from test points back to a point of origin. The addition of wireless communications functionality is an example of how the transceivers used in this self-monitoring system provide machine to machine communications so that test data is readily available in most circumstances.

Systems disclosed herein provide the hardware and software to peer into a communications path to analyze its state at a particular locality via "in band" testing. The system, furthermore, provides information for predicting when an outage is likely or imminent along a particular data path. One key to this functionality lies in utilizing strategically placed transceivers that manage content data traffic and testing data traffic within a single device. In other words, the testing data does not require an external circuit or an injection into a data stream because the testing is integrated into the data communications circuit in the same channel as communications data being transmitted.

Figure 1:
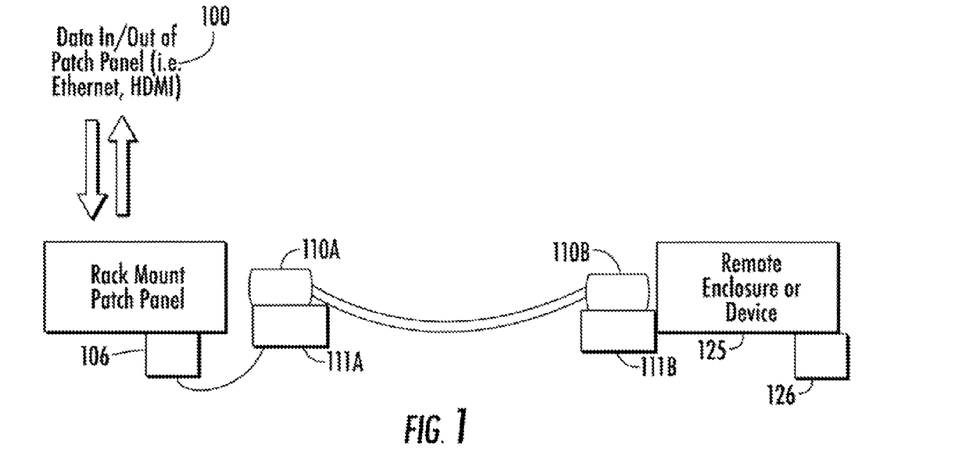
FIG. 1 is a schematic diagram of a patch panel device supporting external data transmitted along a conductor through a connector to a remote device or enclosure.

FIG. 1 illustrates an overview of a self-monitoring cable system disclosed herein. The system is notable in that an integrated transceiver incorporates test data and content data within the same communications channel and provides options for physically placing the transceiver in strategic locations within the network. In the example of FIG. 1, content data 100 transmitted into and out of a rack mount patch panel 105 may be in any number of formats such as an Ethernet input and output. The data processing of the input data prepares the data for transmission to a remote enclosure or device 125 on the network. In the example of FIG. 1, the transmission to the remote enclosure or device 125 occurs via a cable 115, which can be a series of cables adjoined by connector housings 110A, 110B at appropriate places. In one non-limiting example, the cable 115 is a fiber optic cable transmitting optical data across a fiber optic network of cables 115 in which connector housings provide junction points for the optical fibers. An example of a connector housing along these lines is shown in commonly owned and currently pending U.S. patent application Ser. No. 13/896,074 and is incorporated herein by reference as a non-limiting example of the kind of housing that could be used in the network under consideration.

The system of FIG. 1 incorporates an integrated transceiver that is capable of managing the substantive data communications traveling through the rack mounted patch panel 105 and across the cable 115. FIG. 1 illustrates and explains that the transceiver manages bi-directional data communications for a successful handshake with a transceiver at a remote enclosure or device 125. In particular, FIG. 1 illustrates that the transceiver disclosed herein may be successfully positioned and utilized in a variety of locations across the network. In one example a first transceiver 106 is mounted in the rack and plugs into the appropriate position in a standard panel 105, managing communications from that location. In a different example, a transceiver 111A is located in a connector housing 110A instead of the patch panel 105 (i.e., the transceivers noted as reference numbers 106 and 111A are options for selection). The same options for placing the transceiver are available at equipment other than the rack mount patch panel 105, such that transceivers for this system may be placed in remote connector housings 110B located out in the field or even in remote enclosures and devices 125 on the network. In other words, the self-monitoring system disclosed herein may use numerous transceivers in strategically located points that optimize not only content data transmission but also testing data transmission. As shown in FIG. 1, transceivers operating out in the field may be placed in any number of locations such as a transceiver 111B positioned inside a cable connector housing or a transceiver 126 located in disparate devices that are remote from an originating rack 105.

Figure 2:
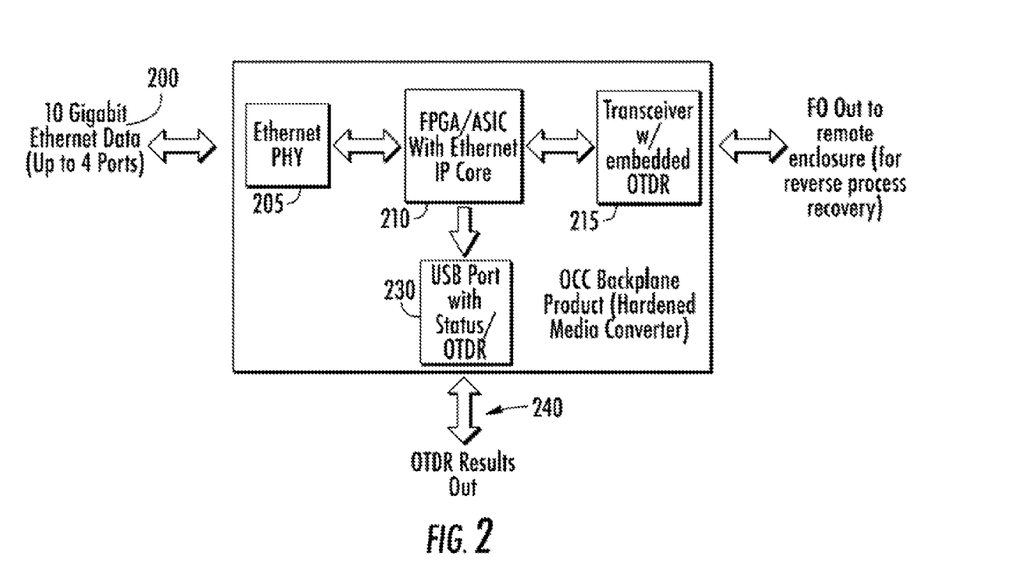
FIG. 2 is a schematic diagram of hardware implementing the self-monitoring cable system disclosed herein via a media converter assembly.

FIG. 2 illustrates the hardware associated with one non-limiting embodiment of the self-monitoring network implemented in part by a media converter 200 that includes inbound and outbound data processing components as well as an integrated testing capability. FIG. 2 utilizes certain notations for an input Ethernet data stream and an output fiber optic data stream for convenience of illustration, but the system disclosed herein is not limited to such an embodiment. Thus systems embodying the invention which provide testing capability "in situ" or "in band" within a data communications channel, without requiring a particular test data injection process, can be utilized across transmission protocols of many types.

FIG. 2 illustrates input data 203 being processed via a media converter 200 that includes the appropriate hardware for receiving data 205 (whether incoming via fiber, copper, wireless or otherwise) and processing bi-directional data via a transceiver 215 embedded with time domain reflectometer (TDR) testing capabilities. Due to the integration of the system of FIG. 2 within a fiber optic network, the transceiver 215 integrates optical time domain reflectometry (OTDR) capabilities. Optical Time Domain Reflectometry is generally known in the industry. However, the hardware shown in FIG. 2 allows for OTDR testing data to be integrated directly within a live data stream processed by the media converter 200. The transceiver 215 of FIG. 2, as used with the other system components, is part of a fiber optic coupler implemented in a media converter 200 that allows test data from OTDR components, integrated into the transceiver, to be sent to remote locations "in band" with content data, such as the data that originates as Ethernet data 203. The overall bi-directional media converter 200 of FIG. 2 accepts the incoming data, such as HDMI compliant data, according to an appropriate protocol, provides any necessary translations for transmission along a different medium (e.g., fiber optics), and incorporates test data (e.g., time domain reflectometry data) into the communications channel in use without disrupting traditional data transmission.

The fiber optic coupler, or media converter 200, shown in FIG. 2 provides an integrated approach to data transmission and data testing utilizing "in band" transmission techniques. The fiber optic coupler, or media converter 200, shown in FIG. 2 is installed in a network rack, but systems embodying the invention may accommodate locating the coupling operation at other system nodes as well. After receiving incoming data via connection points, such as the Ethernet connection and physical layer 205 shown, a field programmable gate array (FPGA) or an application specific integrated circuit (ASIC) utilizes an appropriate core to accommodate data transmission to a transceiver 215 for bi-directional communication with a fiber optic network.

The transceiver 215 utilized herein includes OTDR capabilities for testing both inbound and outbound circuit data paths connected to the transceiver 215 with integrated time domain reflectometry testing components. In one non-limiting example, the transceiver 215 includes a transceiver application specific integrated circuit (ASIC) and light sources (e.g., vertical cavity surface emitting lasers or "VCSEL" technology) to implement an expanded beam optical interface between the inbound and outbound data protocols. (As an aside, the system disclosed herein may accommodate distributed feedback laser technology (DFB) as well.) The transceiver utilizes these components to provide optical time domain reflectometry testing of the network and to provide test results from incoming reflected light transmissions reflected from discontinuities or faults along the fiber optic circuit. The testing results can be processed by the algorithms programmed into the transceiver ASIC. The media converter 200 is provided with a port 230 for providing test data output 240 for analysis. FIG. 2 indicates that in one example, the output data from the media converter 200 of FIG. 2 is transmitted via a bi-directional fiber network 225. The output of the testing data 240 may be directed to a stand-alone software package for analysis, or to an Ethernet web-page-hosted interface, or some combination of the two.

Figure 3:
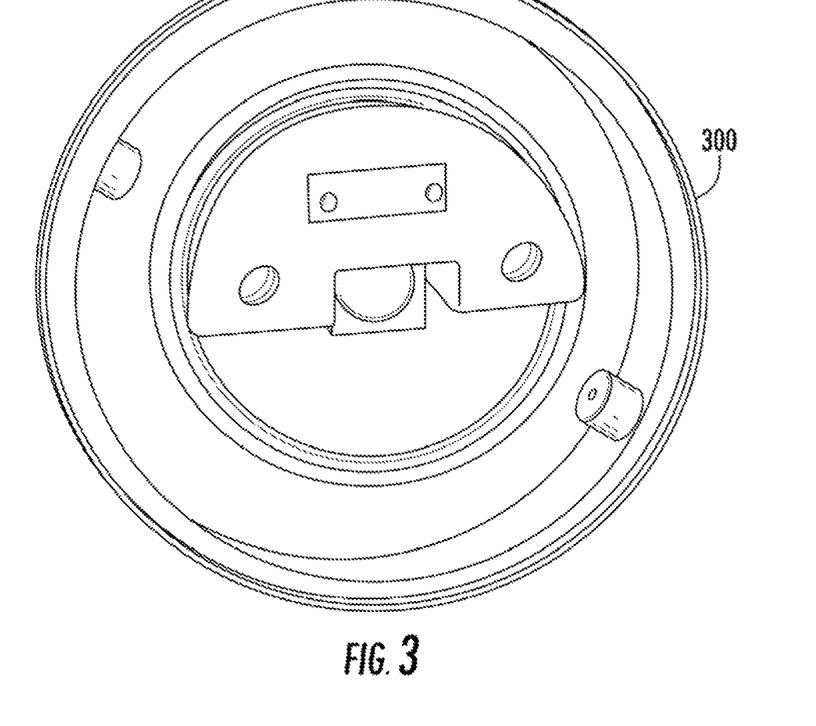
FIG. 3 is a front plan view of a cable connector in which a transceiver with integrated testing ability may be housed in the system disclosed herein.
Figure 4:
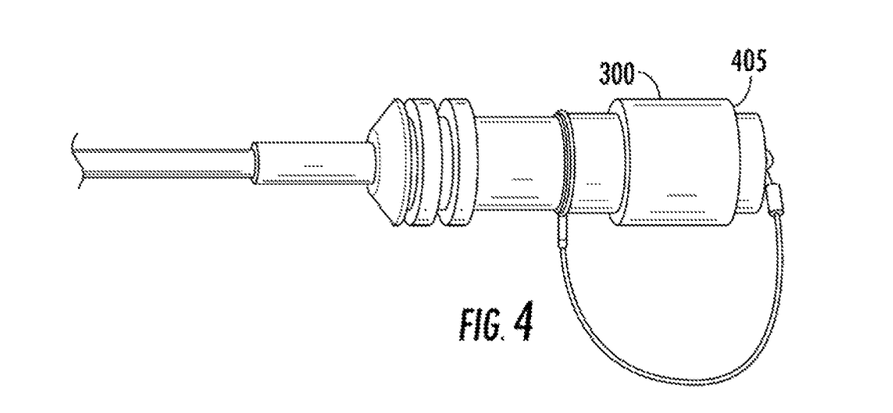
FIG. 4 is a side plan view of the cable connector of FIG. 3.

The system of FIGS. 1 and 2 illustrate that the media converter 200 of FIG. 2 may provide an overall processing center for not only managing routine data communications across diverse incoming and outgoing networks (exemplified by Ethernet data 203 and fiber network 225), but also incorporates test data onto each live channel in an appropriate band. In one embodiment this overarching processing capability located in the media converter 200 may be positioned into a system rack along with a patch panel 105, thereby utilizing example transceiver 106 which would be equivalent to transceiver 215 of FIG. 2. The self-monitoring nature of the disclosed system, however, does not stop there. The transceiver portion 215 of the media converter 200 may be utilized on its own in remote and strategically placed sites on the network to provide a means of testing the forward looking and backward looking sectors of the network. In this sense, a transceiver equipped with OTDR capabilities may be installed in remote devices outside a controlling rack mount panel, including cable connectors 110, remote devices 125 or reeled units that are deployed in the field. Placing these testing transceivers, such as transceiver 111A or 111B of FIG. 1 in unique locations, such as within a cable connector 110A, 110B, adds "in band" testing abilities. The system disclosed herein, therefore, incorporates the structures and components that allow for testing and communications "handshakes" between components across the network, because the OTDR enabled transceivers 215 may be placed out in the field at pre-arranged points on the network. As shown in FIGS. 3 and 4, a cable connector 300 includes a housing 405 with ample room to hold the transceiver assembly necessary to implement testing data transmission and communications between multiple pairs of transceivers throughout the network.

The self-monitoring functionality of the system is, furthermore, enhanced by incorporating wireless technologies into the transceiver assembly so that when a fault across a particular data path occurs, the transceivers communicating with other for communication purposes have an additional avenue to transmit at least the test data if not all content data. In one embodiment of the system that does not limit the disclosed invention, the transceivers positioned across a network, particularly fiber optic networks, include wireless transmission components that accommodate successful transmission of test data. The test data may originate as optical data via optical time domain reflectometry (OTDR) components, or the test data may be prospective data gathered by environmental sensors, such as temperature sensors, pressure sensors, moisture sensors, and the like.

In an example system, the "weightless" transmission protocol provides an avenue for transmitting the test data generated by an OTDR embedded transceiver, as well as content data if necessary. The weightless transmission protocol has been developed by the Weightless Special Interest Group and provides a machine to machine interface between designated terminals in a network and a base station (i.e., the rack and panel 105) as well as vice versa. The weightless protocol provides communications over the low frequency spectrum and is available for transmitting test data over a long range. The weightless data transmission occurs over the unlicensed spectrum, or the white space band, similar to UHF TV channels. A fiber backhaul allows for OTDR test data originating at numerous points along a fiber optic network to be transmitted back to a base station via wireless (e.g. "weightless" protocol) transmission.

Figure 5:
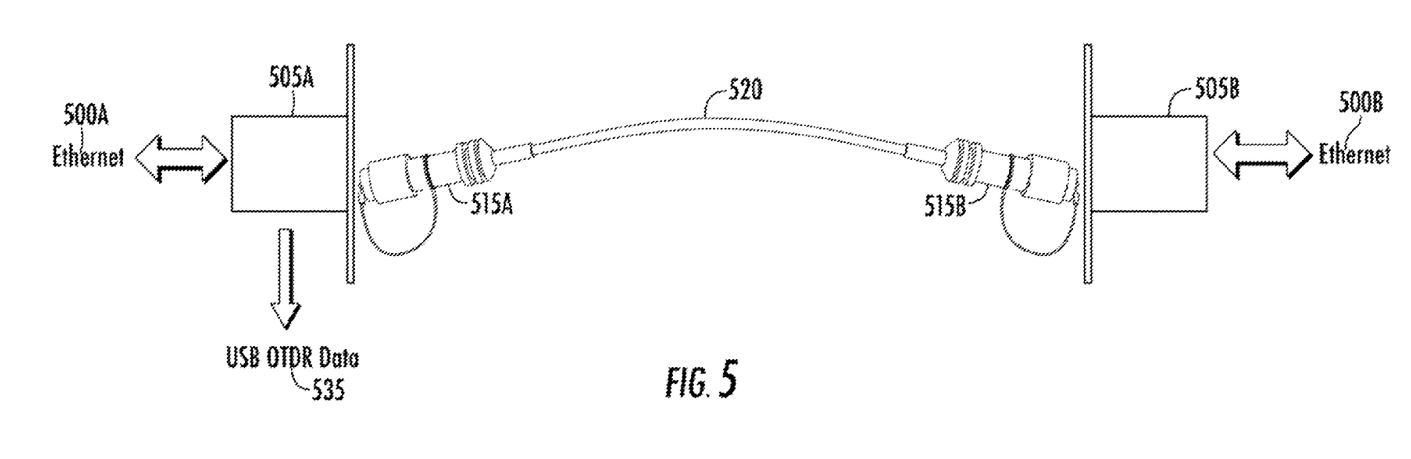
FIG. 5 is a schematic drawing of the overall system implementing the self-monitoring cable system along connected portions of a data network.

As shown in FIG. 5, the additional functionality presented by utilizing weightless wireless protocol on unlicensed frequencies in the wireless spectrum allows for testing a network implemented across numerous cables and ultimately controlled at diverse points by receptacles 505 housing the electronics similar to those shown in FIG. 2 with transceivers embedded with OTDR capabilities dispersed across the network in appropriate connectors 515 or even deployable reels in the field.

The embodiments disclosed herein allow for appropriate testing within an overarching network, such as that shown in FIG. 5 and ensures better coordination of test data across networks of diverse protocols.

To summarize the disclosure up to this point, self-monitoring systems embodying the invention and shown particularly in FIG. 5 include the following four aspects:

(1) Link testing and time domain reflectometer pulses emanate from the same VCSEL laser source that transmits ITOP and ITOP-IMOD optical waveforms.

(2) In some embodiments, the system performs link level tests while in service, but posts an optical link (Tx/Rx) out of service to conduct OTDR testing. A difference between classical models and the system described herein is that the test pulse emits from the same VCSEL light source as the optical content data.

(3) An active device is integrated into a fiber optic receptacle. Thus two receptacles form a symmetric system and allow for bi-directional testing as well as fault detection and location.

(4) The algorithm and session level communication for trouble shooting and fault determination communicates between the pair of receptacles via (a) optical link and/or (b) via the wireless domain using emerging Weightless SIG M2M standards. The adoption of Weightless SIG M2M standard into the pair of receptacles enables the system to negotiate link level testing via low UHF frequencies, in the event the optical path is severed. The M2M capability also allows the system to be "Internet or Everything" (IoE) ready.

Figure 6:
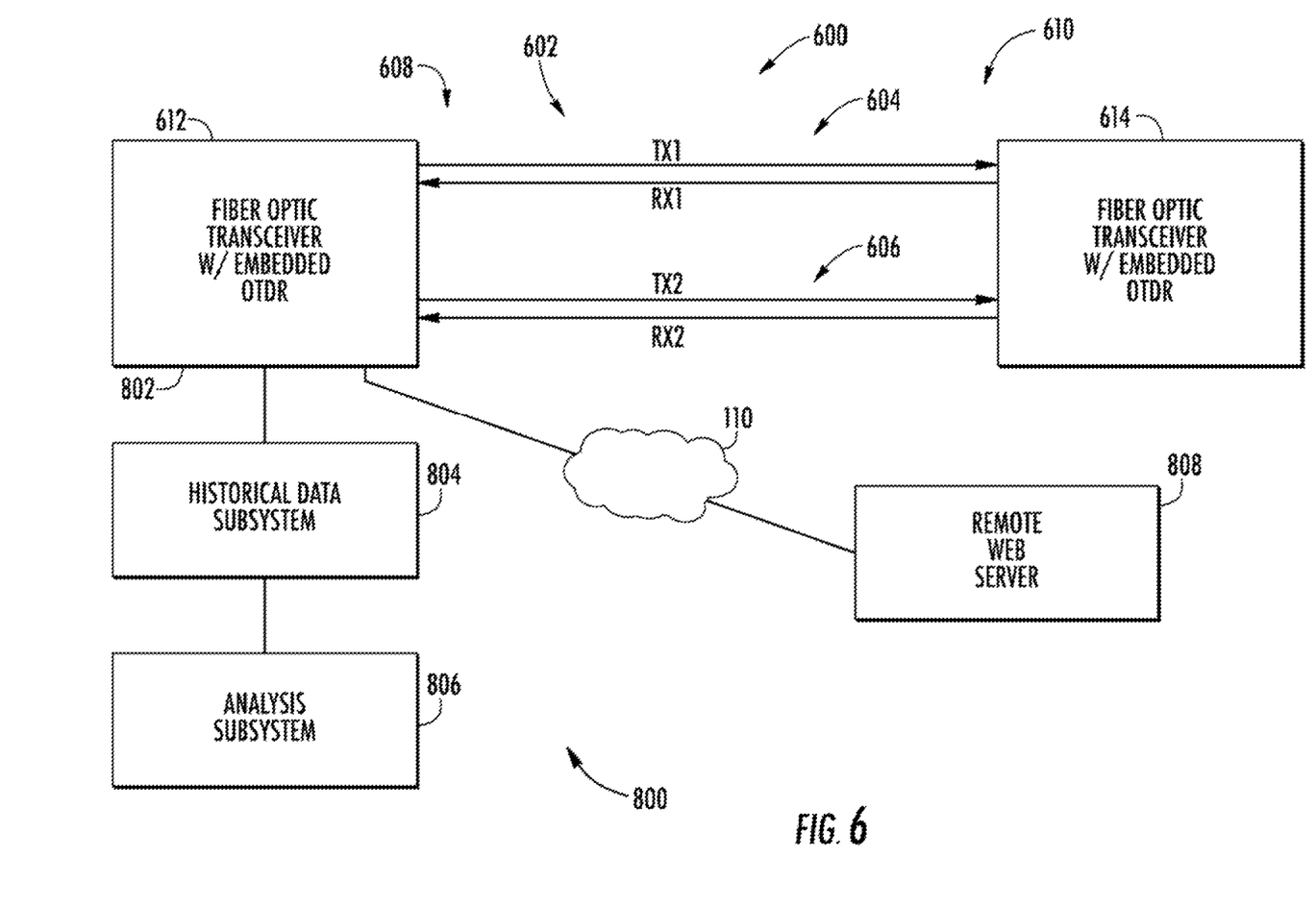
FIG. 6 is a schematic drawing of a cabling system that includes two data transmission channels, each including a TX/RX pair.

With particular reference to FIG. 6, a cabling system 600 provides continuous transport of data as well as testing. The system 600 includes a cable 602, in turn including two data transmission channels 604 and 606, each including a TX/RX pair. Accordingly, in the illustrated embodiment, the optical fibers of each pair enable data transmission in respective opposite directions. Although an optical fiber system 600 is illustrated, the invention is not so limited; the cable 602 may for example include copper wires. The cable 602 has opposite ends 608 and 610.

In the illustrated embodiment, first and second transceivers 612 and 614 are connected at respective opposite ends 608 and 610 of the cable 602. However, only one of the transceivers 612 or 614 needs to have embedded testing and auditing capability embodying the invention. In the illustrated embodiment, each of the transceivers 612 and 614 is functionally capable of both a data transmission mode and a test or audit mode.

More particularly, at least one of the transceivers 612 and 614 is operable to periodically alternate between a first operational mode characterized by data transmission on one of the data transmission channels, for example the channel 604, and testing or auditing the other of the data transmission channels, for example the channel 606; and a second operational mode characterized by data transmission on the other, in this example the channel 606, of the data transmission channels and testing or auditing the one of the data transmission channels, in this example the channel 604. As a result, at all times at least one of the data transmission channels 604 and 606 is available for data transmission.

In general, each transceiver 612 and 614 effects testing or auditing employing Time Domain Reflectometry (TDR). More particularly, in the illustrated embodiment in which the data transmission channels 604 and 606 are embodied as optical fibers, each transceiver 612 and 614 effects testing or auditing employing Optical Time Domain Reflectometry (OTDR). However, other known methodologies may be employed for testing and auditing, such as analog modulation, rather than TDR or OTDR.

Figure 7:
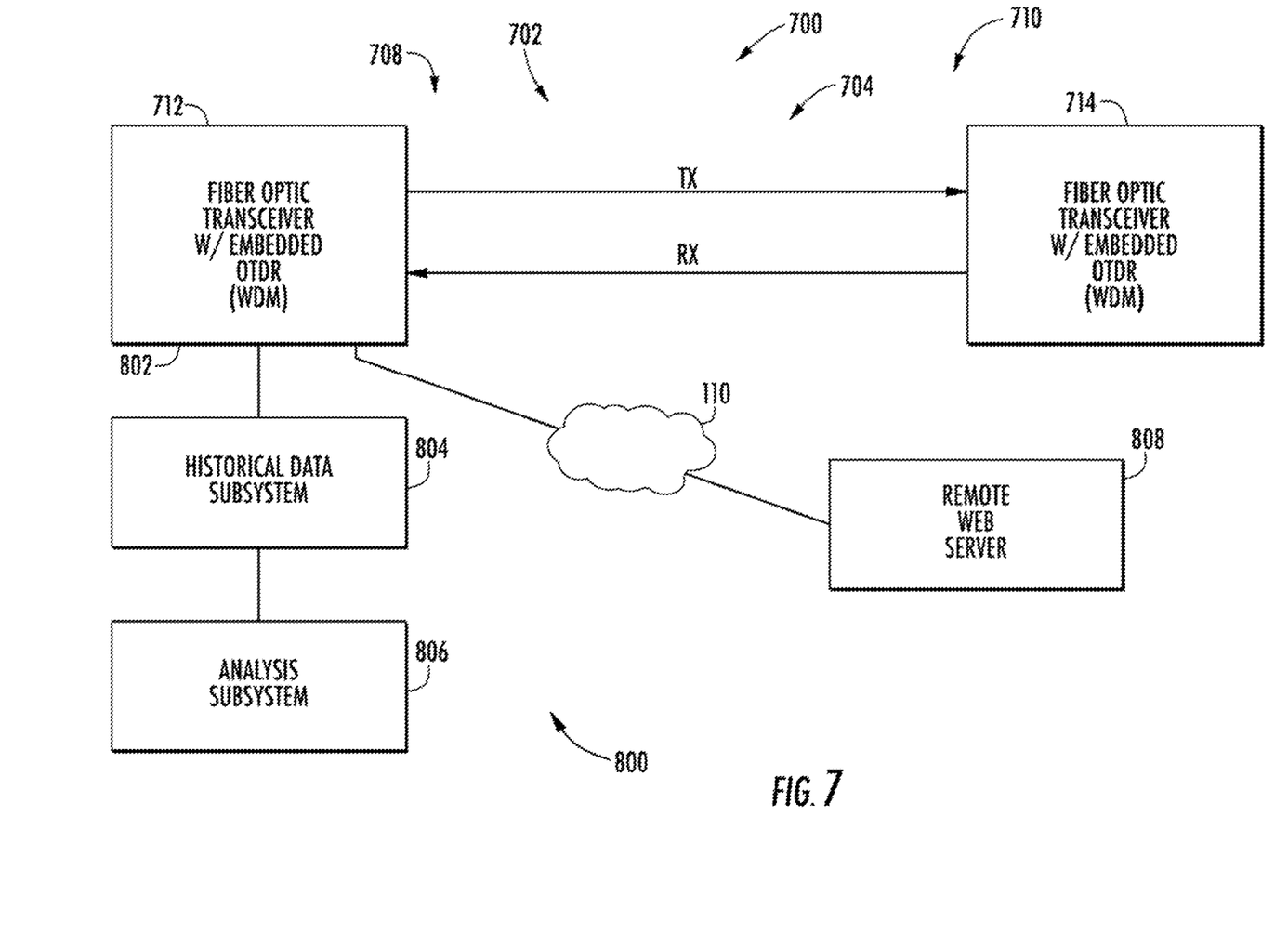
FIG. 7 is a schematic drawing of a cabling system including a single TX/RX pair, and employing Wave Division Multiplexing for testing or auditing.
Figure 8:
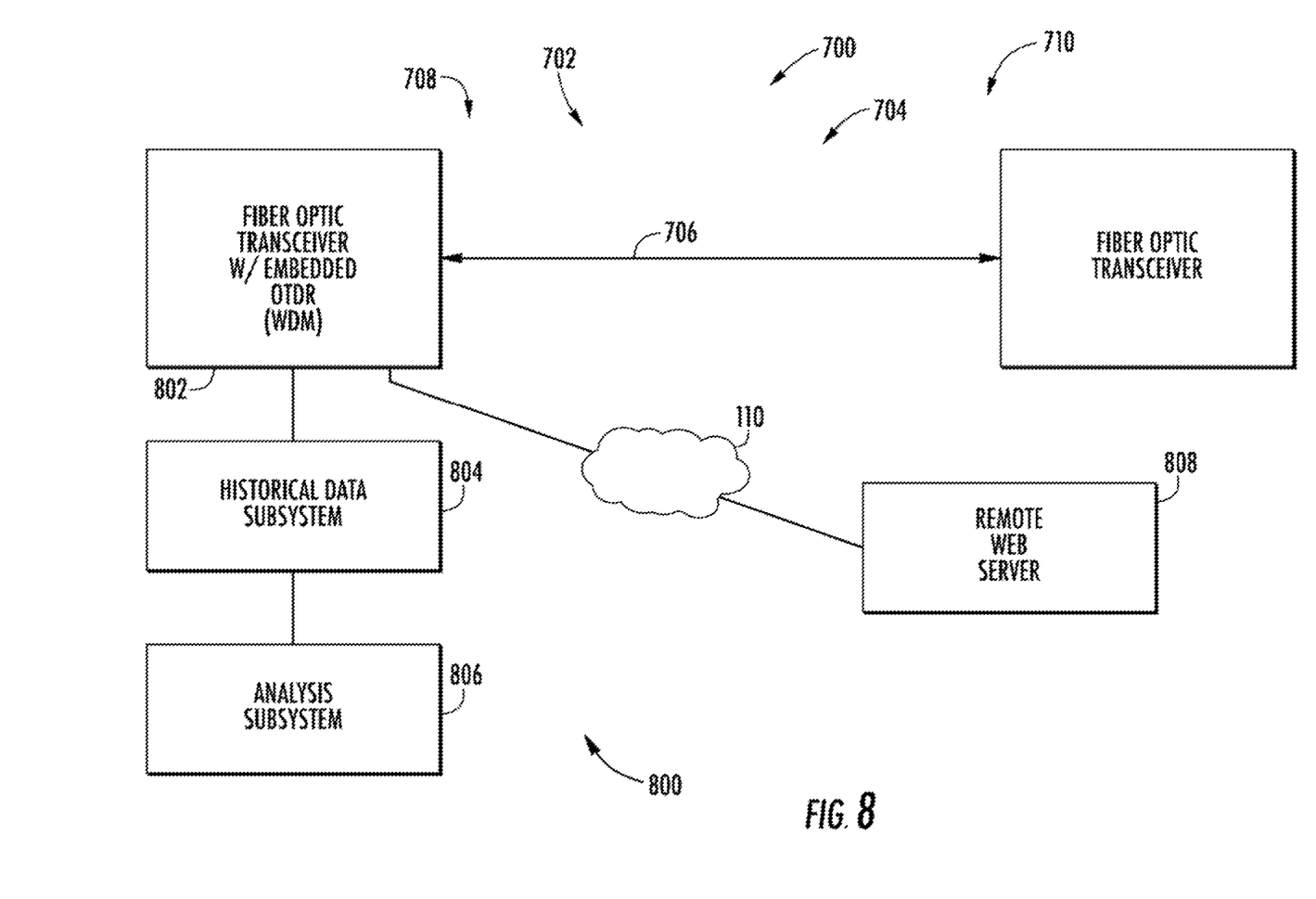
FIG. 8 is a schematic drawing of a cabling system including a single optical fiber and Wave Division Multiplexing for bidirectional data transmission as well as Wave Division Multiplexing for testing or auditing.

With particular reference to FIG. 7, a cabling system 700 provides continuous transport of data as well as testing. In FIG. 7, the, system 700 includes a cable 702, in turn including a single data transmission channel 704, in the form of a TX/RX pair, which enable data transmission in respective opposite directions. Alternatively, and as illustrated in FIG. 8, since Wave Division Multiplexing is employed, the data transmission channel 704 may be embodied as a cable 706 including a single optical fiber and Wave Division Multiplexing for bidirectional data transmission as well as Wave Division Multiplexing for testing or auditing. Although an optical fiber system 700 is illustrated, the invention is not so limited; the cable 702 or 706 may for example include copper wires. The cable 702 or 706 has opposite ends 708 and 710.

In the illustrated embodiment, first and second transceivers 712 and 714 are connected at respective opposite ends 708 and 710 of the cable 702 or 706. However, only one of the transceivers 712 or 714 needs to have embedded testing and auditing capability embodying the invention. In the illustrated embodiment, each of the transceivers 712 and 714 is functionally capable of both a data transmission mode employing one wavelength, and testing or auditing employing another wavelength. As a result, at all times the data transmission channel is available for data transmission.

In the cabling system 700 of FIG. 7 or FIG. 8, each of the transceivers 712 and 714 is operable to periodically alternate between a first operational mode characterized by data transmission employing a first wavelength and testing or auditing employing a second wavelength, and a second operational mode characterized by data transmission employing the second wavelength and testing or auditing employing the first wavelength.

Again, in general, each transceiver 712 and 714 effects testing or auditing employing Time Domain Reflectometry (TDR). More particularly, in the illustrated embodiment in which the data transmission channel 704 is embodied as at least one optical fiber, each transceiver 712 and 714 effects testing or auditing employing Optical Time Domain Reflectometry (OTDR). However, other known methodologies may be employed for testing and auditing, such as analog modulation, rather than TDR or OTDR.

The cabling systems of FIGS. 6, 7 and 8 each also include a failure-prediction system, generally designated 800. The failure-prediction subsystem 800 includes a testing or auditing subsystem 802 for functionally testing a data transmission channel, as described hereinabove. The failure-prediction subsystem 800 additionally includes a historical data subsystem 804 for collecting and storing functional test results. In addition, the failure-prediction subsystem 800 includes an analysis subsystem 806 for tracking stored functional test results over time to determine system degradation prior to actual failure of the data transmission channel.

In one embodiment the failure-prediction system 800 includes a remotely-hosted web server 808 and respective database that collects data for installed cabling systems with functional test results. The remotely-hosted web server 808 is connected via the internet, represented at 110. The remotely-hosted web server 808 enables a user to login and view functional test results and/or cabling system status for the cabling system.

In another aspect, the invention is embodied in a system placed into service by one of three events: (a) though semi-autonomous commands initiated on behalf of the transport layer; (b) though autonomous commands initiated on behalf of the physical layer; and (c) though manual commands initiated on behalf of the presentation layer.

In yet another aspect, the invention is embodied in a system that reports its status to all layers of the transport protocol. Thus, the system: (a) reports critical optical link status; (b) reports operational optical link status; and (c) reports conformation of command execution.

As another aspect, the invention is embodied in a system that provides combination of multiple buses for transport over fiber, such as HDMI, VGA, Ethernet, PCIe, RF over fiber by use of A/D and DAC ASICS, while providing testing OTDR results from either method.

As another aspect, the invention is embodied in a system that collects OTDR data of an operational fiber communications link, performs and communicates analysis of the change in OTDR results over time.

As another aspect, the invention is embodied in a system that uses that collected historical data and attempts to predict failure of the system by observing degradation of the OTDR results, prior to loss of digital communications link.

As another aspect, the invention is embodied in a cabling system that provides data transmission and OTDR status output viewable on a localized display (presentation layer), such as PC with software interface, or LCD screen as part of the cabling system.

As another aspect, the invention is embodied in an optical cabling system that provides status updates by communicating OTDR data or other respective data to a remote server through a standardized communications interface, such as the internet, cellular communications, GPS, satellite uplink, etc.

As another aspect, the invention is embodied in a remotely hosted web server and respective database that collects data for installed cabling systems with OTDR functional test results, for which a user can login to and view OTDR results and/or cabling system status for a cabling system that is performing both data transmission and OTDR testing functions simultaneously.

Systems embodying the invention may be incorporated into communication link systems by one or more of the following applications: (a) a separate, non-integrated application running in parallel with an existing communication link, without interfering with the communication link; (b) a passive application integrated into various data link layers without interfering with native link communication protocols, with reporting capability; and (c) An active application, fully integrated into newer data link standards, with autonomous, semi-autonomous and user control within the layered structures.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A cabling system that provides continuous transport of data as well as testing, said system comprising:
    a cable including two data transmission channels;
    a plurality of transceivers, including first and second transceivers at respective opposite ends of said cable connected to said data transmission channels, at least one of said plurality of transceivers functionally capable of both a data transmission mode and a test or audit mode;
    said at least one of said plurality of transceivers operable to periodically alternate between a first operational mode characterized by data transmission on one of said data transmission channels and testing or auditing the other of said data transmission channels, and a second operational mode characterized by data transmission on the other of said data transmission channels and testing or auditing the one of said data transmission channels;
    whereby at all times at least one of said data transmission channels is available for data transmission; and
    wherein at least one of said plurality of transceivers is selectively placed at a pre-arranged point on the network to permit testing data transmission and communications between multiple pairs of said plurality of transceivers throughout the network.

2. The cabling system of claim 1, wherein said data transmission channels comprise optical fibers.

3. The cabling system of claim 1, wherein each of said data transmission channels comprises a pair of optical fibers, the optical fibers of each pair enabling data transmission in respective opposite directions.

4. The cabling system of claim 1, wherein said at least one of said transceivers effects testing or auditing employing Time Domain Reflectometry (TDR).

5. The cabling system of claim 1, wherein
    said data transmission channels comprise optical fibers, and wherein
    said at least one of said transceivers effects testing or auditing employing Optical Time Domain Reflectometry (OTDR).

6. A cabling system that provides continuous transport of data as well as testing, said system comprising:
    a cable including a data transmission channel; and
    a plurality of transceivers, including first and second transceivers at respective opposite ends of said cable connected to said data transmission channel, at least one of said transceivers functionally capable of both data transmission employing one wavelength and testing or auditing employing another wavelength;
    said at least one of said plurality of transceivers being operable to periodically alternate between a first operational mode characterized by data transmission employing a first wavelength and testing or auditing employing a second wavelength, and a second operational mode characterized by data transmission employing the second wavelength and testing or auditing employing the first wavelength;
    whereby at all times said data transmission channel is available for data transmission; and
    wherein at least one of said plurality of transceivers is selectively placed at a pre-arranged point on the network to permit testing data transmission and communications between multiple pairs of said plurality of transceivers throughout the network.

7. The cabling system of claim 6, wherein said data transmission channel comprises optical fibers.

8. The cabling system of claim 6, wherein said data transmission channel comprises a pair of optical fibers, the optical fibers enabling data transmission in respective opposite directions.

9. The cabling system of claim 6, wherein said at least one of said transceivers effects testing or auditing employing Time Domain Reflectometry (TDR).

10. The cabling system of claim 6, wherein
    said data transmission channel comprises optical fibers, and wherein
    said at least one of said transceivers effects testing or auditing employing Optical Time Domain Reflectometry (OTDR).

11. In a cabling system that provides continuous transport of data as well as testing, a failure prediction system comprising:
    a plurality of transceivers wherein at least one of said plurality of transceivers is functionally capable of both a data transmission mode and a test or audit mode;
    wherein at least one of said plurality of transceivers is selectively placed at a pre-arranged point on the network to permit testing data transmission and communications between multiple pairs of said plurality of transceivers throughout the network;
    a testing or auditing subsystem for at least periodically measuring discontinuities in a data transmission channel for functionally testing the data transmission channel;
    a historical data subsystem for collecting and storing discontinuity measurements; and
    an analysis subsystem for tracking stored discontinuity measurements over time to determine system degradation prior to actual failure of the data transmission channel.

12. The failure prediction system of claim 11, wherein
    said data transmission channel comprises optical fibers, and wherein
    said testing or auditing subsystem effects testing or auditing employing Optical Time Domain Reflectometry (OTDR).

13. The failure prediction system of claim 11, which is included in a cabling system in turn comprising:
    a cable including two data transmission channels;
    first and second transceivers at respective opposite ends of said cable connected to said data transmission channels, at least one of said transceivers functionally capable of both a data transmission mode and a test or audit mode; and
    said at least one of said transceivers operable to periodically alternate between a first operational mode characterized by data transmission on one of said data transmission channels and testing or auditing the other of said data transmission channels, and a second operational mode characterized by data transmission on the other of said data transmission channels and testing or auditing the one of said data transmission channels;
    whereby at all times at least one of said data transmission channels is available for data transmission.

14. The failure prediction system of claim 11, which is included in a cabling system in turn comprising:
- a cable including a data transmission channel; and
- first and second transceivers at respective opposite ends of said cable connected to said data transmission channel, at least one of said transceivers functionally capable of both data transmission employing one wavelength and testing or auditing employing another wavelength;
- whereby at all times said data transmission channel is available for data transmission.

15. The failure prediction system of claim 12, further comprising:
- a remotely hosted web server and respective database that collects data for installed cabling systems with functional test results, said remotely hosted web server enabling a user to login and view functional test results and/or cabling system status for the cabling system.

\* \* \* \* \*